United States Patent Office 3,510,534
Patented May 5, 1970

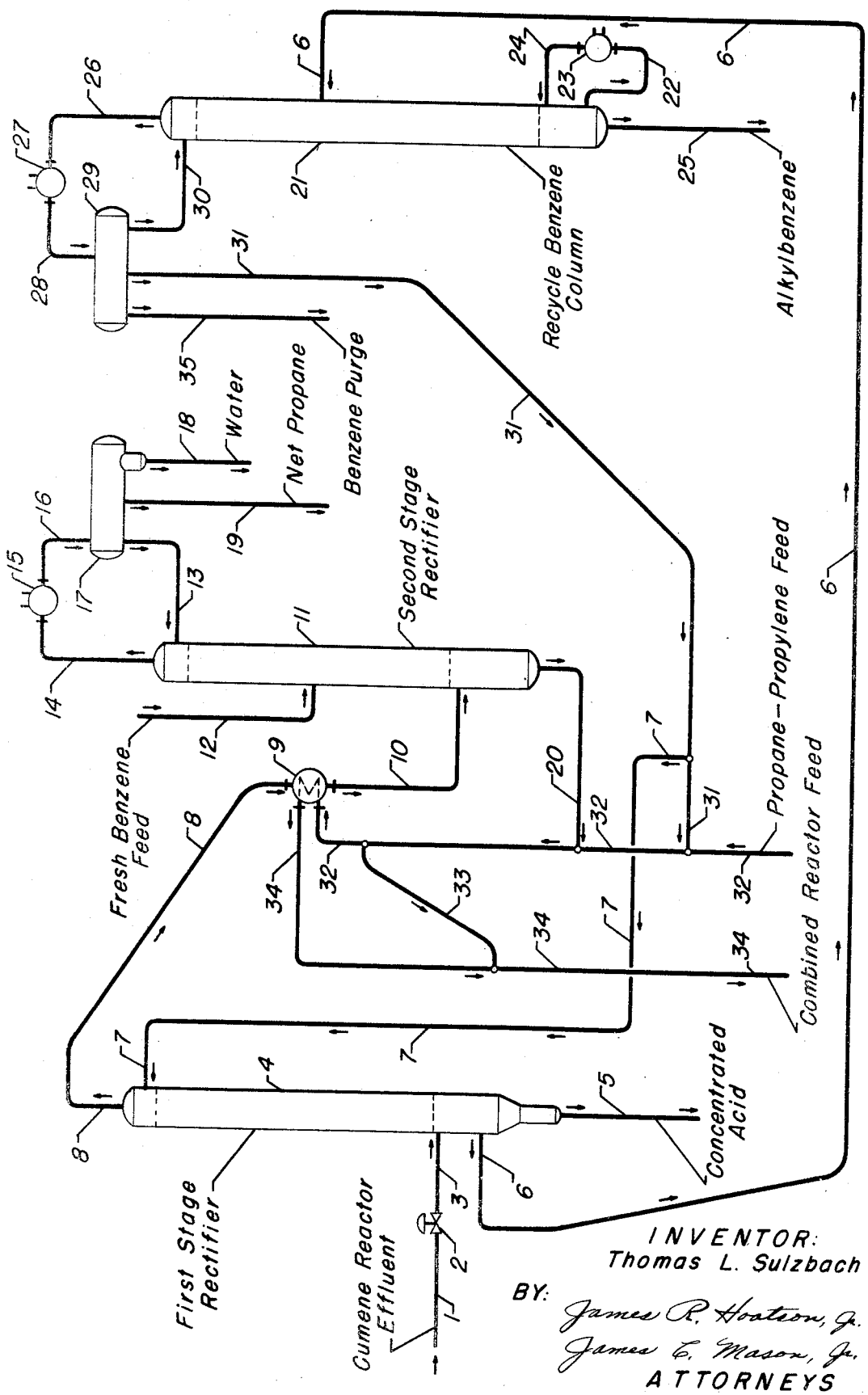

3,510,534
PROCESS FOR AROMATIC ALKYLATION AND OLEFINIC OLIGOMERIZATION
Thomas L. Sulzbach, Elk Grove Village, Ill., assignor to Universal Oil Products Company, Des Plaines, Ill., a corporation of Delaware
Filed June 6, 1968, Ser. No. 734,922
Int. Cl. C07c *3/10, 3/52, 7/04*
U.S. Cl. 260—671                                15 Claims

ABSTRACT OF THE DISCLOSURE

Separation process for a reaction zone effluent containing at least three components, such as an aromatic alkylation reaction zone effluent. The effluent is passed into a two stage flash rectification zone under conditions sufficient to provide a first stream comprising diluent, a second stream comprising diluent and alkylatable aromatic compound, and a third stream comprising alkylatable aromatic compound and alkylated aromatic compound. The third stream is fractionated to provide a fourth stream comprising alkylatable aromatic compound and a fifth stream comprising alkylated aromatic compound. The fifth stream is recovered while the second and fourth streams are returned to the reaction zone. The process is equally effective in the separation of the effluent from an oligomerization reaction zone. Specific application of the process is in the synthesis of ethylbenzene, cumene, heptene, propylene-trimer, and propylene-tetramer.

Field of invention

The present invention relates to a separation process. It particularly relates to the separation of the effluent from an alkylation reaction zone to provide a diluent for return to the reaction zone, a reactant for return to the reaction zone, and a product stream of alkylated aromatic compound. The inventive process also relates to the separation of the effluent from an oligomerization reaction zone to provide a diluent for return to the reaction zone, a stream of partially-oligomerized product for return to the reaction zone, and a product stream of oligomerized product. Most particularly the present invention relates to a method of separation which results in an improved process for alkylation of benzene with an ethylene-ethane mixture, for alkylation of benzene with a propylene-propane mixture, for the olgiomerization of propylene in a propylene-propane mixture, and for the co-oligomerization of propylene and butene in a reactive mixture containing propane and butane.

The present invention finds one broad application in the production of alkylated aromatic hydrocarbons for use in subsequent chemical synthesis. The present invention particularly finds application in the production of isopropylbenzene or cumene which is utilized in the synthesis of phenol, acetone, alpha-methylstyrene, and acetophenone. These cumene-derived chemicals are intermediates in the synthesis of resins for plastics and nylon. A further application of the inventive process is in the synthesis of ethylbenzene. Virtually all of the ethylbenzene commercially produced is dehydrogenated to styrene monomer, although small quantities are used as solvents and as intermediates in the synthesis of other chemicals. Ethylbenzene-derived styrene finds utility in the synthesis of polyester resins, polystyrene and other plastics, as well as in the synthesis of styrene-butadiene rubber and in the formulation of coatings including latex paints.

Application of the inventive process may also be found in the alkylation of substituted aromatics such as phenol, which when alkylated with isobutylenes forms o-tertiary-butylphenol which is an intermediate in the synthesis of other chemicals, and forms p-tertiarybutylphenol which is used to modify phenolformaldehyde resins. A further application of the inventive process upon substituted aromatic hydrocarbons may be found in the alkylation of para-hydroxyanisole with tertiary butyl alcohol or isobutylene to form butylated hydroxyanisole which finds utility as an antioxidant in the preservation of foods.

The present invention finds additional application in the olgiomerization of olefin-acting compounds. Oligomerization of propylene may be undertaken to produce commercial fractions of propylene-trimer and propylene-tetramer, within the scope of the inventive process. Trimer finds utility in the synthesis of nonyl-phenol detergents and in the synthesis of decyl alcohols by the oxo process. Tetramer is also used in the synthesis of detergents. The inventive process also finds application in the synthesis of commercial fractions of heptene which are produced by the co-oligomerization of propylene and butenes in a reaction mixture comprising propylene, propane, butene, and butane. Heptene is utilized in the synthesis of octyl alcohols by the oxo process. (It is to be noted that oligomerization of olefin hydrocarbons is more commonly referred to as "polymerization of olefins" in the petroleum refining industry.)

Description of the prior art

As indicated above, the present invention particularly relates to the recovery of isopropylbenzene, or cumene, from an alkylation reaction effluent. In the commercial manufacture of cumene it is the art to charge benzene and propylene into a reactor containing a solid phosphoric acid catalyst.

Because it is desired to minimize the dialkylation of benzene which produces di-isopropylbenzene by-product, it is the art to have a molar deficiency of propylene in the reaction zone and normally this deficiency is provided by maintaining the ratio of benzene to propylene at about 8:1. The resulting alkylation effluent which leaves the reaction zone will therefore contain about seven moles of unreacted benzene per mole of product cumene, and the excess benzene must be separated from the effluent and recycled to the reaction zone in conjunction with the fresh benzene feed which is charged to the process.

The propylene reactant which is typically charged to the process will contain unreactive diluent comprising propane with traces of ethane and butane. When the propylene feed is derived from a pyrolysis plant these diluents will normally be less than 10 mole percent, while a propylene feed derived from the gas recovery unit of a fluid catalytic cracking plant will often contain as much as 35 to 40 mole percent of unreactive diluents. In addition to the unreactive propane diluent which is inherent in the propylene feed, it is typically the art to introduce additional propane diluent into the reaction zone to provide a thermal quench for the exothermic alkylation reaction in order that the catalyst temperature may be controlled at the desired level. This propane quench may be introduced into the reactor at elevated temperature with the propylene-propane fresh feed, or it may be introduced at elevated temperature or at ambient temperature into the reaction zone at several intermediate quench points between several catalyst beds. The alkylation effluent which leaves the typical reaction zone therefore contains a considerable amount of propane diluent. This diluent must be separated from the effluent in order that a portion may be recycled to the reaction zone and in order that a quantity may be withdrawn from the process. The quantity withdrawn is equivalent to the quantity which is being introduced into the process in the propylene-propane feed, and it must be withdrawn from the process in order to avoid accumulation of unreactive diluents in the process unit.

It is the art in the manufacture of cumene to charge the alkylation effluent to a fractionation train comprising a depropanizer column, a benzene column, and a cumene column. The effluent enters the depropanizer wherein the propane diluent is removed overhead to provide the propane recycle stream for return to the reaction zone and a net propane product stream which is normally withdrawn to the fuel gas system or sent to product storage as liquefied petroleum gas (LPG). The bottoms liquid from the depropanizer passes into the benzene column which produces a benzene overhead stream. Part of the benzene produced provides the required recycle to the reaction zone and a second part is withdrawn from the process in order to avoid the accumulation of non-aromatic contaminants which enter the process as trace constituents in the benzene feed. The benzene column bottoms stream passes to a cumene column which produces an overhead comprising high purity cumene product and a bottoms by-product comprising polyalkylated benzene.

In the typical oligomerization process, an olefin-acting compound is oligomerized in the presence of an unreactive diluent to produce a desired oligomerized product and partially-oligomerized product which must be separated therefrom. For example, in the production of propylene-tetramer a typical propylene-propane feed is oligomerized over a solid phosphoric acid catalyst to produce a reactor effluent usually comprising propane, propylene-dimer, propylene-trimer, propylene-tetramer, and propylene-pentamer. It is therefore necessary to depropanize the reactor effluent in order to provide a recycle diluent propane stream for catalyst temperature control and to recycle the propylene-dimer and propylene-trimer to the reaction zone for further oligomerization with propylene to produce additional product propylene-tetramer. It is well known to those skilled in the art that the required separation of the reactor effluent is accomplished by passing the effluent into a series of fractionating columns comprising a depropanizer column, a column for obtaining the desired recycle fraction of partially-oligomerized product, and a column for recovery of the desired oligomerized product.

A similar series of fractionating columns is normally utilized in the separation of the reactor effluent resulting from the synthesis of heptene by co-oligomerization of propylene and butenes. The unreactive diluent which must be recycled to the reactor for temperature control normally comprises a mixture of propane and butane. Because the olefinic feed contains propylene, butenes, and possible traces of other olefins, the reactor effluent will contain hexenes, heptenes, octenes, and heavier oligomerization products. It is the art to recover heptenes and octenes as the product fraction and to recycle hexenes and lighter olefins for additional oligomerization.

Summary of the invention

It is an object of the present invention to provide a method for the separation of a process stream containing at least three components. It is a further object of the present invention to provide a process for the separation of a reaction zone effluent. It is a particular object of the present invention to provide a separation process for the recovery of alkylated aromatic compounds from the effluent of an alkylation reaction zone and for the recovery of oligomerized products from the effluent of an oligomerization reaction zone. It is a specific object of this invention to produce ethylbenzene, cumene, heptene, propylene-trimer, and propylene-tetramer in a more economical and facile manner.

These and other objectives will be readily ascertained from the following description and the attached drawing which is a simplified flow diagram setting forth one specific embodiment of the invention.

In accordance with these objectives, a broad embodiment of this invention may be characterized as a process for separating a reaction zone effluent containing at least three components which comprises passing the effluent from a reaction zone into a first rectifying zone maintained under separation conditions; withdrawing from the first rectifying zone a first fraction comprising a first component and a first portion of a second component, and a second fraction comprising a second portion of the second component and a third component; passing at least a part of the first fraction into a second rectifying zone maintained under separation conditions; withdrawing from the second rectifying zone a third fraction comprising first component, and a fourth fraction comprising first component and second component; passing the second fraction to a separation zone maintained under separation conditions; withdrawing from the separation zone at least a fifth fraction comprising second component and a sixth fraction comprising third component in high concentration; passing the fourth fraction into the reaction zone; and, recovering the sixth fraction.

A particular embodiment of the present invention may be characterized by this separation process wherein a part of the fifth fraction is passed to the first rectifying zone as reflux.

A preferred embodiment of the present invention may be characterized by this separation process wherein the reaction zone comprises an alkylation reaction zone, the first component comprises an unreactive diluent, the second component comprises an alkylatable aromatic compound, and the third component comprises an alkylated aromatic compound.

A further preferred embodiment of the present invention may be characterized by this separation process wherein the reaction zone comprises an oligomerization reaction zone, the first component comprises an unreactive diluent, the second component comprises partially-oligomerized product, and the third component comprises oligomerized product.

In a more specific embodiment of the inventive process as defined in the embodiments above, at least a part of the fifth fraction is passed into the reaction zone.

These and other more specific embodiments will be more clearly set forth hereinafter.

An understanding of the present invention may now be readily obtained by referring to the accompanying drawing which sets forth a simplified flow for carrying out one specific example wherein the process of the present invention is practiced.

Drawing and example

As previously noted, the particularly preferred embodiment of this invention comprises the inventive process wherein the alkylatable aromatic compound is benzene, the olefin-acting alkylating agent is propylene, the unreactive diluent is propane, and the desired monoalkylated aromatic compound is high purity cumene. Referring now to the drawing, propylene reacts with benzene over a solid phosphoric acid catalyst in a reaction zone, not shown, under alkylation reaction conditions.

The resulting cumene reactor effluent enters the inventive process via line 1 at a rate of 3368.39 mols/hr., at a temperature of 460° F., and at a pressure of 500 p.s.i.g. (As used herein, the term "mols/hr." refers to pound moles per hour.) This reactor effluent comprising propane, unreacted benzene, cumene product, and heavy alkylbenzene byproduct, passes through back pressure control valve 2 and enters a first stage rectifier column 4 via line 3, wherein it is flashed at a pressure of 245 p.s.i.g. and at a flash temperature of 410° F. The flashed effluent enters the rectifier column at a lower locus below suitable fractionating trays which provide a rectification zone within column 4. The hot vapor portion of the effluent passes up through the rectification zone of the first stage rectifier column 4 and is processed in a manner which will be disclosed hereinafter. The hot liquid portion of the effluent drops to the bottom of the first stage rectifier column and is separted therein into two phases. An aqueous phase containing concentrated phosphoric acid is withdrawn via line 5 and is sent to a disposal system, not shown. This stream normally comprises about one gallon per day of aqueous concentrated phosphoric acid and comprises the typical phosphoric acid solution which is leached off of the catalyst in the alkylation reaction zone. The major portion of the liquid comprises benzene and alkylated benzene compounds and is withdrawn at a rate of 1965.29 mols/hr. from the bottom of the first stage rectifier column 4 via line 6 at a temperature of 390° F. and at a pressure of 245 p.s.i.g.

The hydrocarbon liquid withdrawn from the bottom of first stage rectifier column 4 passes through a pressure reduction valve, not shown, and enters recycle benzene column 21 at a temperature of 245° F. and at a pressure of 17 p.s.i.g. Recycle benzene column 21 is operated under conditions sufficient to separate benzene from the alkylated benzene products which were produced in the reaction zone. Column 21 is provided with a typical reboiler circuit as a heat input source. Liquid alkylbenzene which passes to the bottom of column 21 is in part withdrawn therefrom and circulated via line 22 at 375° F. into reboiler 23. The heat input at reboiler 23 is sufficient to provide that a part of circulating liquid is vaporized and the resulting reboiled stream is then passed back into column 21 via line 24 at a temperature of 375° F. and at a pressure of 21 p.s.i.g. A second portion of the liquid which accumulates at the bottom of recycle benzene column 21 is withdrawn therefrom via line 25 at a rate of 292.13 mols/hr. and at a temperature of 375° F. The net alkylbenzene of line 25 is sent to a cumene fractionation column, not shown, wherein it is separated to provide 282.40 mols/hr. of high purity cumene product and 9.73 mols/hr. of heavy alkylbenzene by-product.

An overhead vapor stream is withdrawn from the top of recycle benzene column 21 via line 26 at a rate of 3470.36 mols/hr. This vaporized benzene enters condenser 27 at 225° F. and 15 p.s.i.g. The benzene vapors are condensed therein and are passed via line 28 into receiver 29 at a temperature of 100° F. and at a pressure of 10 p.s.i.g. The benzene liquid is separated into three portions by withdrawal from receiver 29. A first portion comprising 1797.20 mols/hr. is withdrawn via line 30 and returned to the top of recycle benzene column 21 as reflux. A second portion comprising 5.20 mols/hr. is withdrawn via line 35 as a benzene purge and sent to subsequent recovery means, not shown. The withdrawal of the benzene purge stream via line 35 is necessary in order to avoid the accumulation of unreactive hydrocarbon constituents which enter the alkylation process as trace contaminants of the fresh benzene feed. These contaminants must be withdrawn from the system in this manner in order to avoid their accumulation within the alkylation processing unit.

A third portion of the benzene liquid is withdrawn from receiver 29 via line 31 at a rate of 1667.96 mols/hr. This recycle portion of the liquid benzene is separated into two parts. A first part comprising 1018.07 mols/hr. is recycled back to the alkylation zone via line 31 in a manner which will be more fully disclosed hereinafter. A second part of this recycle benzene fraction is withdrawn from line 31 via line 7 at a rate of 649.89 mols/hr. This second part is passed to the top of first stage rectifier column 4 at 100° F. and provides the reflux which is necessary for the desired rectification within column 4.

As the flashed effluent vapors, which enter first stage rectifier column 4, pass up through the rectification zone within the column, they are scrubbed by the refluxing liquids therein in order to provide that virtually no alkylated benzene compounds will leave the top of column 4 with the vapor. A final rectified flash vapor is withdrawn from the first stage rectifier column 4 via line 8 at a rate of 2052.99 mols/hr., at a temperature of 385° F., and at a pressure of 243 p.s.i.g. This hot vapor, which comprises propane and benzene, enters heat exchanger 9 wherein it is partially condensed and thereafter discharged via line 10 at 320° F. and 233 p.s.i.g.

The resulting partially condensed fluid enters a second stage rectifier column 11 via line 10 at a lower locus below a rectification zone comprising typical fractionation trays. The vapor passes up through the column and is rectified on the fractionating trays which are contained therein while the condensed liquid is dropped to the bottom of column 11 and accumulated therein. As the hot vapor passes upward through the rectification zone within column 11, it is contacted with cooler down-flowing liquid which serves to remove substantially all benzene from the vapor phase.

Fresh benzene feed which is subsequently consumed in the synthesis of cumene within the alkylation reaction zone enters the aromatic alkylation process at second stage rectifier column 11 via line 12 at a rate of 297.04 mols/hr. and at a temperature of 104° F. This fresh benzene feed contains traces of moisture and is typically introduced in the separation zone of the alkylation unit rather than being introduced directly into the reactor vessel since excessive amounts of water are detrimental to the solid phosphoric acid catalyst which is contained therein. By introducing the fresh benzene feed into second stage rectifier column 11, the benzene is suitably dried prior to its introduction into the alkylation reaction zone and its contact with the solid phosphoric acid catalyst.

A rectified vapor leaves the top of the second stage rectifier column 11 via line 14 at a temperature of 120° F. and at a pressure of 230 p.s.i.g. This rectified vapor comprising propane and water enters condenser 15 at a rate of 1456.95 mols/hr. and is condensed and cooled therein to 100° F. The condensed vapor stream leaves condenser 15 via line 16 and enters separator 17 which is maintained at a temperature of 100° F. and at a pressure of 225 p.s.i.g. The condensed vapor is separated therein into two liquid phases comprising a hydrocarbon phase and an aqueous phase. A portion of the hydrocarbon comprising rectified propane is withdrawn from separator 17 via line 13 and returned to second stage rectifier column 11 at a rate of 1456.01 mols/hr. as a reflux stream. A second portion of the hydrocarbon phase comprising substantially pure propane is withdrawn via line 19 at a rate of 0.94 mol/hr. This net propane product may be consumed as fuel gas, or it may be sent to an LPG recovery unit. The aqueous phase comprising moisture which is removed from the feed streams entering the second stage rectifier column 11 is withdrawn via line 18 and sent to disposal, not shown.

The liquid hydrocarbon which accumulates at the bottom of the second stage rectifier column 11 is withdrawn therefrom via line 20 at a rate of 2349.09 mols/hr., at a temperature of 240° F., and at a pressure of 233 p.s.i.g. This bottoms stream comprises benzene and 550.15 mols/hr. of propane, and this fraction is returned to the reaction zone as a part of the combined feed in a manner set forth hereinbelow.

A fresh propane-propylene feed is introduced into the alkylation process via line 32 at a rate of 305.48 mols/hr. and at a temperature of 80° F. This stream provides the propylene which is subsequently consumed in the synthesis of cumene within the alkylation reaction zone. The propane-propylene feed is combined with the recycle benzene fraction circulated via line 31 and with the rectified column bottoms circulated via line 20 to provide a total combined feed of 3672.64 mols/hr. By the admixing of these three streams, a temperature of 190° F. is obtained on the resulting combined feed in line 32.

The combined feed passes via line 32 into heat exchanger 9 to provide the cooling medium therein which yields the desired degree of partial condensation of the first stage rectified vapor of line 8. Provision is made by line 33 so that a part of the combined feed may bypass heat exchanger 9 and thereby provide a means of control for the degree of partial condensation which is necessary in producing the feed to the second stage rectifier column 11. A heated portion of the combined reactor feed is withdrawn from heat exchanger 9 via line 34 and recombined with the portion which by-passes the heat exchanger via line 33. This final combined reactor feed is passed via line 34 into the alkylation reaction zone, not shown, at the rate of 3672.64 mols/hr., at a temperature of 320° F. and at a pressure of 515 p.s.i.g. This combined reactor feed comprising propylene, propane, and benzene is reacted over the solid phosphoric acid catalyst to produce the cumene reactor effluent which enters the process of the present invention via line 1 for separation in the manner set forth hereinabove.

Preferred embodiments

Several important advantages of the inventive process may be readily ascertained from the foregoing process description.

The first advantage which will be readily seen is that the depropanizer column of the typical prior art process is eliminated. Whereas the total reactor effluent of 3368.39 moles per hour would be charged to the depropanizer column under the practices of the prior art, in the present invention about one third of the benzene effluent and all of the alkylbenzene effluent pass directly to the recycle benzene column as the flash liquid in line 6. The column diameters of the two rectification columns 4 and 11 are significantly less than the diameter of the prior art depropanizer column due to this reduced loading. It may also be noted that since the propane, which is recycled to the reaction zone, is not produced as a depropanizer overhead fraction, the overhead condensing system of the second stage rectifier column is significantly reduced in size over the condensing system of the prior art depropanizer column. Additionally, it will be seen that the process of the present invention eliminates the reboiler system of the prior art depropanizer column. The net result is that the present invention yields a considerable savings in capital cost over the prior art installations comprising a depropanizer fractionator.

There is also a reduction of operating cost for the cumene plant due to the reduction and elimination of utilities which are required at the typical prior art depropanizer column. Since the two stage rectification system of the present invention has eliminated the reboiler system of the prior art depropanizer column, the heat required to reboil the depropanizer bottoms liquid has been eliminated. In addition, there is a considerable saving of condenser duty at the second stage rectifier column because the recycle propane does not pass through the column as an overhead product. If the propane recycle were an overhead stream of the column, a considerable addition of reflux would be required in order to make high purity propane recycle, since the propane product which leaves the column via line 19 must be benzene-free for use as fuel gas or LPG. The propane recycle may be allowed to contain considerable amounts of benzene, however, since it is also necessary to return benzene to the alkylation reactor. Since the propane recycle is an overhead product of the prior art depropanizer column, it is forced to meet the purity specification of the product propane, thus adding reflux and condensing utilities expense with no beneficial result to the process. The present invention eliminates this wasteful utility cost.

There are similar savings in the capital cost and utility expenses to be realized at the recycle benzene column. It will be seen that about two thirds of the benzene recycle is returned to the alkylation reactor as a hot bottoms stream from the second stage rectifier column. This results in a reduced loading at the recycle benzene column for not only is the feed reduced but the amount of reflux is reduced accordingly. Thus, the column diameter, overhead condensing system, reboiler system, and other auxiliary equipment may be significantly reduced due to the reduced column loading. Not only is capital cost reduced for this equipment, but utilities expense for operating the benzene column is also reduced.

There is an additional savings in utility expenses by the manner by which the recycle benzene is processed in the inventive process. The recycle benzene which must be returned to the reaction zone must be heated to reaction temperature. A part of this heating is accomplished by passing the cold benzene recycle in line 31 through partial condenser 9 via line 32. Not only is the cold benzene heated to 320° F. by this system, but it provides part of the cooling medium for the exchanger and thus reduces cooling water requirements for the cumene plant. In addition, about two thirds of the benzene recycle is removed as a hot liquid from the bottom of the second stage rectifier column 11 via line 20. Since this portion of the benzene recycle is not cooled to 100° F. as in the prior art processing methods, a considerable savings in preheating expense results.

Similarly, it will be seen that in the particular embodiment described above, the recycle propane stream is returned to the reaction zone in admixture with the propylene and benzene in the combined feed stream. The recycle propane must therefore be preheated to reaction temperature, and if the recycle propane were derived from the prior art depropanizer column the recycle propane would require temperature elevation from 100° F. By the practice of the present invention, however, the propane recycle is included in the bottoms liquid from the second stage rectifier column, thus requiring temperature elevation only from 240° F., and thus resulting in a reduction of utility expense.

Other advantages in addition to those set forth hereinabove will be apparent to those skilled in the art.

While the embodiment set forth has been specific to the manufacture of cumene by the inventive process, it must be realized that the present invention is also applicable to the manufacture of other alkylated aromatic hydrocarbons such as ethylbenzene. The inventive process may also be found to be effective in the separation of the effluent from the synthesis of other alkylated aromatic compounds, such as alkylphenols, in the presence of an unreactive diluent.

It must be noted that the flash zone comprising first stage rectifier column 4 was maintained at 410° F. and 245 p.s.i.g. in the example given, but that these conditions are specific to the example. The conditions of reflux rate, temperature, and pressure may be adjusted to give the desired separation between liquid and vapor in the effluent. Preferably, these conditions will provide that about half to two thirds of the benzene in the reactor effluent will flash into the vapor phase and that half to one third will remain in the liquid phase. However, the liquid-vapor split may be shifted up or down as desired by choice of the operating conditions, provided that substantially all of the unreactive propane diluent is in the vapor phase and that substantially all of the alkylated benzene remains in the liquid phase. Thus, it is within the scope of the process of the present invention that the rectified flash vapor in line 8 will contain substantially all of the unreactive propane vapor diluent and that it may contain from about 10% to about 90% of the unreacted benzene, while the flash liquid in line 6 may correspondingly contain from about 90% to about 10% of the benzene and substantially all of the alkylated benzene.

The primary control of the separation of the effluent into liquid and vapor is the amount of pressure drop to which the effluent is subjected upon leaving the reaction zone and entering the flash zone comprising first stage rectifier column 4. As noted above, it is preferabe that the pressure drop, or flashing, should provide that about half to two thirds of the benzene is in the vapor phase and half to one third is in the liquid phase. Although the alkylation reaction may occur at pressures in excess of 1000 p.s.i.g., little or no flashing of vapor would occur at such pressure in the flash zone of column 4, and since the cost of fabricating the vessel for the flash zone would be excessive at such a pressure level, it is advantageous to keep the pressure at about 500 p.s.i.g. or below.

Since the rectified vapor leaving first stage rectifier column 4 must enter a partial condensing exchanger 9 in order to provide a partly liquid feed for the subsequent second stage rectifier column 11 operating under elevated pressure, it is important not to operate the flash zone at a pressure which is below the pressure of the subsequent column. Thus, while the first stage rectifier column 4 could be maintained at a pressure in the range of from about 50 p.s.i.g. to 200 p.s.i.g., upon partial condensation of the flash vapor it would be required that the condensate and vapor be pumped into the second stage rectifier column 11. Therefore, the pressure within the flash zone should be maintained in the range of from 200 p.s.i.g. to about 500 p.s.i.g., and it is preferable that the pressure only be sufficiently high to transfer the first stage rectified vapor via lines 8 and 10 into the subsequent second stage rectifier column 11 without mechanical assistance. Thus, it is preferable that the flash zone comprising first stage rectifier column 4 be maintained at a pressure of from about 200 p.s.i.g. to 500 p.s.i.g., and more specifically that the pressure be maintained at from 200 p.s.i.g. to about 300 p.s.i.g. when applied to cumene production.

The temperature within the first stage rectifier column 4 will be substantially at the flash point of the reactor effluent for the specific reactor effluent composition and for the specific pressure within the flash zone. The temperature will always be below the reactor outlet temperature since the flashing of the effluent will cause a substantially adiabatic temperature drop. Those skilled in the art will realize, however, that the temperature at the top of the first stage rectifier column 4 will always be below the flash temperature which exists at the bottom of the column below the rectification section since cold reflux contacts the upflowing vapor before it leaves the top of the column. The temperature within the first stage rectifier column 4 will, therefore, normally be in the range of from about 250° F. to about 500° F., and will preferably be in the range of from 300° F. to about 425° F. for cumene production.

The degree of cooling and partial condensation which is imposed upon the rectified flash vapor in heat exchanger 9 will be varied as required to provide the desired degree of phase separation between the propane rich vapor which is subsequently rectified in the second stage rectifier column 11, and the net hot condensed liquid which is removed from the bottom of column 11. In the specific embodiment of the example, the rectified flash vapor in line 8 was cooled from 385° F. to 320° F. in order to provide the desired degree of separation in the feed to the second stage rectified column 11. This temperature and degree of cooling, however, are specific to this example. The actual temperature which will be necessary within heat exchanger 9 and the degree of cooling and condensation therein will depend upon the composition of the rectified flash vapor which enters the heat exchanger via line 8 and also upon the pressure under which the exchanger is maintained. Since this exchanger is in direct and open communication with the first stage rectifier column 4, the cooling and partial condensation at heat exchanger 9 will typically occur at a temperature of from about 200° F. to about 500° F. and at a pressure in the range of from about 200 p.s.i.g. to about 500 p.s.i.g. When the inventive process is applied to the separation of cumene pursuant to the preferred embodiment, heat exchanger 9 will typically operate at a pressure in the range of from 200 p.s.i.g. to 300 p.s.i.g. and at a temperature in the range from about 200° F. to 400° F.

The operating conditions which have been disclosed for the second stage rectifier column 11 are also specific to the instant example and are not limiting. The operating conditions within the second stage rectifier column 11 will be adjusted in order to produce a substantially pure net propane product via line 19. Since second stage rectifier column 11 is preferably in open communication with first stage rectifier column 4, the typical pressure within column 11 will be in the range from about 200 to 500 p.s.i.g. As noted in the disclosure in reference to heat exchanger 9, the feed temperature to second stage rectifier column 11 will be adjusted as necessary to provide the desired split between the vapor and liquid phases entering the column. This temperature will be dependent upon the composition of the rectified flash vapor leaving first stage rectifier column 4 via line 8, and it will also be dependent upon the pressure within second stage rectifier column 11. Normally, when the second stage rectifier column 11 is operated to produce a substantially pure propane in the typical cumene synthesis unit, the top of the rectified column will be at substantially the normal boiling point of propane for the specific pressure employed, while the bottom of the rectification zone within column 11 will be typically near the temperature of the feed vapor. Broadly speaking then, the top of second stage rectifier column 11 will be at a temperature of from about 100° F. to about 200° F. while the bottom of the column will be at a temperature in the range of from about 200° F. to about 400° F. Thus, the overall operating temperature within second stage rectifier column 11 for the typical cumene separation will be in the range from about 100° F. to about 400° F.

It should be noted that the foregoing discussion concerning the operating conditions required within the two stage zone of rectification are particularly applicable to the separation of an effluent wherein the subsequent fractionation columns are operated at superatmospheric and atmospheric pressures. It is well known, however, that in alkylating substituted aromatic compounds it is often necessary to fractionate the effluent in a train of columns maintained at subatmospheric pressure. A typical example of such subatmospheric separation is found in the production of butylated hydroxyanisole from the effluent which results in alkylating p-hydroxyanisole with tertiary butyl alcohol. When the first stage rectifier column and the second stage rectifier column of the present invention precede a subatmospheric fractionation train, they may be maintained at superatmospheric or subatmospheric pressure as may be required to accomplish the particular degree of separation which is desired.

The specific operating conditions which may be required within the two stage zone of rectification of the present invention are readily ascertainable for any given reactor effluent composition by those skilled in the art utilizing the teachings which have been presented hereinabove.

It is to be noted that the fractionation section of the example comprises a recycle benzene column. The operating conditions within this fractionation column are specific for the process set forth in the example, and the operating conditions which may be necessary for any other reactor effluent composition will be readily ascertainable by those skilled in the art. It is not therefore necessary within the description of this invention to discuss broad ranges which are required for such a fractionation column or for the cumene column which is required in the overall process but which was not shown in the drawing.

It should be noted that in the example set forth, a solid phosphoric acid catalyst was used in the reaction zone for alkylation of the aromatic. Since aromatic hydrocarbons leach water and phosphoric acid from such catalyst, provision must therefore be made for removal of concentrated phosphoric acid as indicated via line 5. Where other catalyst systems are used in the inventive process such provision for acid removal from the bottom of the first stage rectifier column and from the process may not be necessary.

It will be readily seen that the inventive separation process as set forth in the drawing and example above, wherein cumene is recovered from an aromatic-alkylation reactor effluent, is equally applicable to the separation of an effluent from an oligomerization reactor as, for example, in the recovery of propylene-trimer, propylene-tetramer, or heptene fractions. Those skilled in the art will perceive that partialy-oligomerized product will be returned to the reaction zone via line 20 and line 31 and via line 32 for further reaction with olefin to produce the desired fully oligomerized product in the reaction zone, while the unreactive diluent is returned via line 20 to provide the desired thermal quench in the reaction zone. The benefits which accrue to the cumene process by utilization of the inventive separation process are therefore equally realized when applying the present invention to the synthesis of commercial heptene fractions, propylene-trimer, and propylene-tetramer.

Since the reactor effluent composition will be dependent upon the ratio of olefin to paraffinic diluent in the reactor feed and the degree of oligomerization in the reactor, as effected by the specific operating conditions in the reaction zone, it is not possible to set forth specific operating conditions for the inventive two stage rectification zone as applied to an oligomerization process. The necessary conditions, however, are readily ascertainable by those skilled in the art by discriminately utilizing the teachings which have been presented hereinabove in reference to the operating conditions which are utilizable and which are preferable in the synthesis of cumene.

It must be noted that a further modification of the inventive separation process, as set fotrh hereinabove is within the scope of the present invention. The feed to second stage rectifier column 11 may be first passed to a separator intermediate to column 11 and exchanger 9. The two phases may be separated therein with the vapor phase only being passed to second stage rectifier column 11, or with the vapor phase and only a part of the liquid phase being passed to column 11. The remaining liquid phase collected in the separator would thus by-pass column 11 and be fed directly to line 20 for combination with the hot bottoms from column 11. In effect, such an intermediate separator would provide one additional equilibrium stage in the separation of the net product propane from the recycle mixture of propane and benzene. However, it is the preferred embodiment of this invention not to install an intermediate separator in line 10 to collect the partialy condensed rectified mixture from heat exchanger 9.

From the foregoing discussion, it may now be summarized that a preferred embodiment of the present invention is a process for recovery of alkylated aromatic compounds which comprises passing an alkylation effluent comprising unreactive diluent, alkylatable aromatic compound, and alkylated aromatic compound, from an alkylation reaction zone into a first rectifying zone maintained at a pressure in the range of from about 200 p.s.i.g. to about 500 p.s.i.g., and at a temperature in the range of from about 250° F. to about 500° F.; withdrawing from the first rectifying zone a first fraction comprising diluent and alkylatable aromatic compound and a second fraction comprising alkylatable aromatic compound and alkylated aromatic compound; passing at least a part of the first fraction into a second rectifying zone maintained at a pressure in the range of from about 200 p.s.i.g. to about 500 p.s.i.g. and at a temperature in the range of from about 100° F. to about 400° F.; withdrawing from the second rectifying zone a third fraction comprising unreactive diluent, and a fourth fraction comprising unreactive diluent and alkylatable aromatic compound; passing the second fraction to a separation zone maintained under separation conditions; withdrawing from the separation zone at least a fifth fraction comprising alkylatable aromatic compound and a sixth fraction comprising alkylated aromatic compound in high concentration; passing the fourth fraction into the reaction zone; and recovering said sixth fraction.

It may be further noted that a particularly preferred embodiment of the present invention comprises the embodiment disclosed in the paragraph immediately above, wherein the diluent is propane, the alkylatable aromatic compound is benzene, and the alkylated aromatic compound is cumene, and wherein the two stage zone of rectification is maintained at a pressure in the range of from 200 p.s.i.g. to 300 p.s.i.g. and at a temperature in the range of from 100° F. to 425° F.

The invention claimed is:

1. A two stage rectified flash separation process which comprises:
   (a) passing an organic chemical mixture to be separated, into a first rectified flash zone maintained under separation conditions;
   (b) withdrawing from said first zone an overhead vapor fraction and a bottoms liquid fraction;
   (c) returning a portion of said bottoms liquid fraction to said first zone as reflux therein;
   (d) introducing said vapor fraction into a second rectified flash zone under conditions sufficient to obtain an overhead distillate product and a bottoms product; and,
   (e) recovering said distillate fraction and a portion of said bottoms liquid fraction of step (b).

2. Process of claim 1 wherein said mixture comprises a reactor effluent from an aromatic alkylation reaction zone.

3. Process of claim 1 wherein said mixture comprises a reactor effluent from an olefinic oligomerization reaction zone.

4. Process for separating a reaction zone effluent containing at least three components which comprises:
   (a) passing said effluent from a reaction zone into a first rectifying zone maintained under separation conditions;
   (b) withdrawing from said first rectifying zone a first fraction comprising a first component and a first portion of a second component, and a second fraction comprising a second portion of said second component and a third component;
   (c) passing at least a part of said first fraction into a second rectifying zone maintained under separation conditions;
   (d) withdrawing from said second rectifying zone a third fraction comprising first component, and a fourth fraction comprising first component and second component;
   (e) passing said second fraction to a separation zone maintained under separation conditions;
   (f) withdrawing from said separation zone at least a fifth fraction comprising second component and a sixth fraction comprising third component in high concentration;
   (g) passing said fourth fraction into said reaction zone; and
   (h) recovering said sixth fraction.

5. Process of claim 4 wherein at least a part of said fifth fraction is passed to said reaction zone.

6. Process of claim 4 wherein a part of said fifth fraction is passed to said first rectifying zone as reflux.

7. Process of claim 4 wherein said first fraction is passed into a partial condensing zone maintained under conditions sufficient to provide a vapor fraction and a condensate fraction, said vapor fraction is passed into said second rectifying zone, and at least a part of said condensate fraction is passed into said reaction zone.

8. Process of claim 4 wherein said reaction zone comprises an alkylation reaction zone, said first component comprises an unreactive diluent, said second component comprises an alkylatable aromatic compound, and said third component comprises an alkylated aromatic compound.

9. Process of claim 4 wherein said reaction zone comprises an oligomerization reaction zone, said first component comprises an unreactive diluent, said second component comprises partially-oligomerized product, and said third component comprises oligomerized product.

10. Process for recovery of alkylated aromatic compounds which comprises:
  (a) passing an alkylation effluent comprising unreactive diluent, alkylatable aromatic compound, and alkylated aromatic compound from an alkylation reaction zone into a first rectifying zone maintained at a pressure in the range of from about 200 p.s.i.g. to about 500 p.s.i.g., and at a temperature in the range of from about 250° F. to about 500° F.;
  (b) withdrawing from said first rectifying zone a first fraction comprising diluent and alkylatable aromatic compound and a second fraction comprising alkylatable aromatic compound and alkylated aromatic compound;
  (c) passing at least a part of said first fraction into a second rectifying zone maintained at a pressure in the range of from about 200 p.s.i.g. to about 500 p.s.i.g. and at a temperature in the range of from about 100° F. to about 400° F.;
  (d) withdrawing from said second rectifying zone a third fraction comprising unreactive diluent, and a fourth fraction comprising unreactive diluent and alkylatable aromatic compound;
  (e) passing said second fraction to a separation zone maintained under separation conditions;
  (f) withdrawing from said separation zone at least a fifth fraction comprising alkylatable aromatic compound and a sixth fraction comprising alkylated aromatic compound in high concentration;
  (g) passing said fourth fraction into said reaction zone; and,
  (h) recovering said sixth fraction.

11. Process of claim 10 wherein said alkylatable aromatic compound comprises benzene, said unreactive diluent comprises ethane, and said alkylated aromatic compound comprises ethylbenzene.

12. Process of claim 10 wherein said alkylatable aromatic compound comprises benzene, said unreactive diluent comprises propane, and said alkylated aromatic compound comprises cumene.

13. Process of claim 10 wherein at least a part of said fifth fraction is returned to said reaction zone.

14. Process of claim 10 wherein a part of said fifth fraction is passed to said first rectifying zone as reflux.

15. Process of claim 10 wherein said first fraction is passed into a partial condensing zone maintained under conditions sufficient to provide a vapor fraction and a condensate fraction, said vapor fraction is passed into said second rectifying zone, and at least a part of said condensate fraction is passed into said reaction zone.

References Cited

UNITED STATES PATENTS

| | | | |
|---|---|---|---|
| 3,437,705 | 4/1969 | Jones | 260—671 |
| 3,437,706 | 4/1969 | Gantt et al. | 260—671 |
| 3,437,707 | 4/1969 | Sulzback | 260—671 |
| 3,437,708 | 4/1969 | Gantt | 260—671 |

DELBERT E. GANTZ, Primary Examiner

C. R. DAVIS, Assistant Examiner

U.S. Cl. X.R.

260—666, 674, 683.15